US012617669B1

(12) United States Patent
Bemis et al.

(10) Patent No.: US 12,617,669 B1
(45) Date of Patent: May 5, 2026

(54) ADJUSTABLE SADDLE

(71) Applicant: Diane Bemis, Omaha, NE (US)

(72) Inventors: Diane Bemis, Omaha, NE (US); Lydia DeSchepper, Johnston, IA (US)

(73) Assignee: Diane Bemis, Omaha, NE (US)

( * ) Notice: Subject to any disclaimer, the term of this patent is extended or adjusted under 35 U.S.C. 154(b) by 41 days.

(21) Appl. No.: 18/207,984

(22) Filed: Jun. 9, 2023

Related U.S. Application Data

(60) Provisional application No. 63/350,710, filed on Jun. 9, 2022.

(51) Int. Cl.
*B68C 1/04* (2006.01)
*B68C 1/02* (2006.01)

(52) U.S. Cl.
CPC .......... *B68C 1/04* (2013.01); *B68C 2001/022* (2013.01); *B68C 2001/044* (2013.01)

(58) Field of Classification Search
CPC ....... B68C 1/00; B68C 1/04; B68C 2001/022; B68C 2001/044; B68C 1/12; B68C 1/126
See application file for complete search history.

(56) References Cited

U.S. PATENT DOCUMENTS 548,372 A * 10/1895 Larkin ...................... B68C 1/12 54/66
3,872,653 A * 3/1975 Thompson ................ B68C 1/00 54/4
4,683,709 A * 8/1987 Vasko ....................... B68C 1/12 54/66
5,179,821 A * 1/1993 Hiser ........................ B68C 1/00 54/44.1
5,685,133 A 11/1997 Travis
6,145,478 A * 11/2000 Boyd ........................ B68C 1/00 54/44.1
6,588,185 B1 7/2003 Goblet
7,021,037 B1 4/2006 Szymas
(Continued)

FOREIGN PATENT DOCUMENTS

DE 102011052691 A1 * 7/2012 ............. B68C 1/126
DE 202013005984 U1 * 9/2013 ............... B68C 1/02
(Continued)

OTHER PUBLICATIONS

Rocco, Tina. AAC and Hippotherapy. Speech in Motion [online]. Jan. 24, 2020 [retrieved on Sep. 26, 2024]. Retrieved from Internet. <https://speechinmotion.com/blog/f/aac-and-hippotherapy#:~:text=Unaided%20AAC%20refers%20to%20any,AAC%20into%20the%20equine%20environment.> (Year: 2020).*
(Continued)

*Primary Examiner* — Joshua D Huson
*Assistant Examiner* — Brooke Victoria Schmid
(74) *Attorney, Agent, or Firm* — Suiter Swantz IP

(57) ABSTRACT

An adjustable saddle is disclosed. The adjustable saddle includes a saddle cover. The saddle cover further includes one or more fasteners, a first side, and a second side. The saddle cover also includes one or more blocks. The one or more blocks are configured to be removably couplable to the saddle cover via the one or more fasteners, wherein the one or more blocks form a modular perimeter around a rider, wherein the modular perimeter is configured to stabilize the rider. The adjustable saddle further includes a saddle tree and a saddle pad.

13 Claims, 9 Drawing Sheets

(56) References Cited

U.S. PATENT DOCUMENTS

| | | | | |
|---|---|---|---|---|
| 9,227,831 | B2 | 1/2016 | Bates | |
| 10,974,956 | B2 | 4/2021 | Berreklouw | |
| 2002/0189211 | A1* | 12/2002 | DeCosemo | B68C 1/02 54/44.1 |
| 2006/0117720 | A1* | 6/2006 | DeCosemo | B68C 1/02 54/44.1 |
| 2006/0137300 | A1* | 6/2006 | Van Scoyk | B68C 1/16 54/44.1 |
| 2011/0047944 | A1* | 3/2011 | Longden | B68C 1/02 54/44.1 |
| 2011/0271651 | A1 | 11/2011 | Morgan | |
| 2015/0040523 | A1* | 2/2015 | Seggebruch | B68C 1/12 54/66 |
| 2015/0166325 | A1* | 6/2015 | Mattes | B68C 1/12 54/44.5 |
| 2017/0183216 | A1 | 6/2017 | Kaden | |
| 2022/0332566 | A1* | 10/2022 | Caforio | B68C 1/20 |

FOREIGN PATENT DOCUMENTS

| | | | | |
|---|---|---|---|---|
| FR | 2851765 | A1 * | 9/2004 | B68C 1/20 |
| FR | 2992868 | A1 | 1/2014 | |
| GB | 2279546 | A * | 1/1995 | B68C 1/00 |
| GB | 2571321 | A * | 8/2019 | A01K 27/001 |
| NL | 8901537 | A * | 1/1991 | B68C 1/02 |
| NZ | 569586 | A * | 6/2009 | B68C 1/02 |
| WO | WO-8505093 | A1 * | 11/1985 | |
| WO | WO-9323330 | A1 * | 11/1993 | B68C 1/12 |
| WO | WO-9852866 | A1 * | 11/1998 | B68C 1/00 |
| WO | 2021064500 | A1 | 4/2021 | |

OTHER PUBLICATIONS

Inky Dinky Ltd, Kids Horse Riding Saddle, URL: https://inkydinkysaddles.com/products/synthetic-saddle.

* cited by examiner

110

ADJUSTABLE SADDLE

CROSS-REFERENCE TO RELATED APPLICATIONS

The present application claims the benefit under 35 U.S.C. § 119 (e) of U.S. Provisional Application No. 63/350,710, filed Jun. 9, 2022, which is incorporated herein by reference in the entirety.

TECHNICAL FIELD

The present invention generally relates to saddles, and in particular, to an adaptive modular saddle for helping a person with disabilities ride a horse.

BACKGROUND

Hippotherapy encompasses a range of treatments that involve activities with horses and other equines to promote human physical and mental health, which may include riding a horse via a saddle. People with physical disabilities (e.g., amputation, balance problems, or the like) may not be able to effectively ride a horse via a conventional saddle. Therefore, there is a need to provide a saddle that can accommodate people with varying physical disabilities.

SUMMARY

An adjustable saddle is disclosed, in accordance with embodiments of the present disclosure. In embodiments, the adjustable saddle includes a saddle cover which includes one or more fasteners, a first side, and a second side. In embodiments, the saddle cover includes one or more blocks configured to be removably couplable to the saddle cover via the one or more fasteners, wherein the one or more blocks form a modular perimeter around a rider, wherein the modular perimeter is configured to stabilize the rider. In embodiments, the saddle cover includes a saddle tree. In embodiments, the saddle cover includes a saddle pad.

A saddle cover is disclosed, in accordance with embodiments of the present disclosure. In embodiments, the saddle cover includes a first side. In embodiments, the saddle cover includes a second side. In embodiments, the saddle cover includes one or more fasteners disposed on the second side, wherein the one or more fasteners removably couple one or more blocks to the saddle cover, wherein the one or more blocks form a modular perimeter around a rider, wherein the modular perimeter is configured to stabilize the rider.

An adjustable saddle is disclosed, in accordance with embodiments of the present disclosure. In embodiments, the adjustable saddle includes a saddle cover which includes one or more fasteners, a first side, a second side, and one or more pockets. In embodiments, the saddle cover includes one or more blocks configured to be removably couplable to the saddle cover via the one or more fasteners, wherein the one or more blocks form a modular perimeter around a rider, wherein the modular perimeter is configured to stabilize the rider. In embodiments, the adjustable saddle includes a saddle tree contained within the one or more pockets. In embodiments, the adjustable saddle includes a saddle pad contained within the one or more pockets.

This Summary is provided solely as an introduction to subject matter that is fully described in the Detailed Description and Drawings. The Summary should not be considered to describe essential features nor be used to determine the scope of the Claims. Moreover, it is to be understood that both the foregoing Summary and the following Detailed Description are examples and explanatory only and are not necessarily restrictive of the subject matter claimed.

BRIEF DESCRIPTION OF THE DRAWINGS

The detailed description is described with reference to the accompanying figures. The use of the same reference numbers in different instances in the description and the figures may indicate similar or identical items. Various embodiments or examples ("examples") of the present disclosure are disclosed in the following detailed description and the accompanying drawings. The drawings are not necessarily to scale. In general, operations of disclosed processes may be performed in an arbitrary order, unless otherwise provided in the claims. In the drawings:

DETAILED DESCRIPTION

Figure 1A:
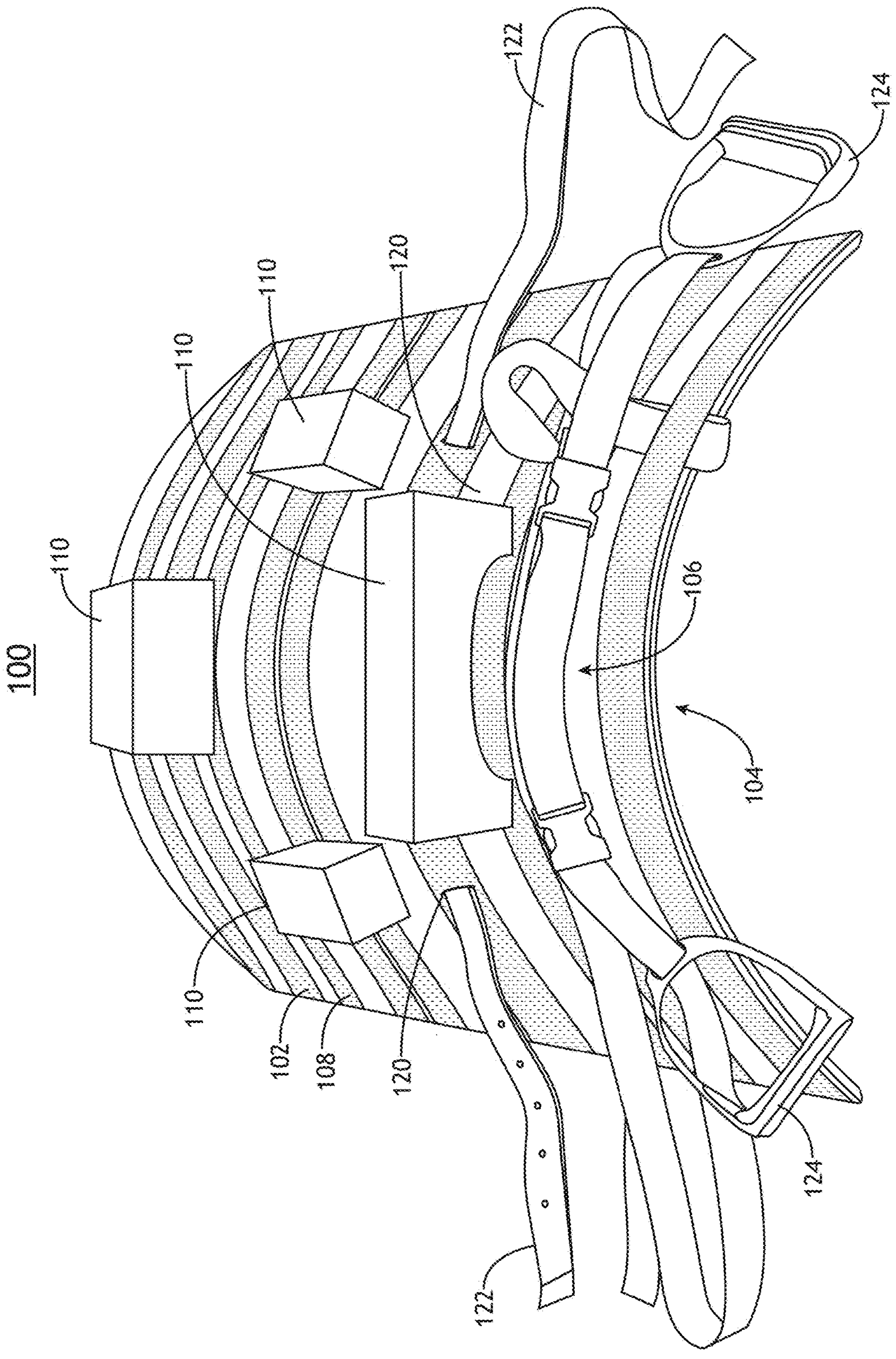
FIG. 1A is a perspective view of an adjustable saddle, in accordance with one or more embodiments of the present disclosure.

Before explaining one or more embodiments of the disclosure in detail, it is to be understood that the embodiments are not limited in their application to the details of construction and the arrangement of the components or steps or methodologies set forth in the following description or illustrated in the drawings. In the following detailed description of embodiments, numerous specific details may be set forth in order to provide a more thorough understanding of the disclosure. However, it will be apparent to one of ordinary skill in the art having the benefit of the instant disclosure that the embodiments disclosed herein may be practiced without some of these specific details. In other instances, well-known features may not be described in detail to avoid unnecessarily complicating the instant disclosure.

Reference will now be made in detail to subject matter disclosed, which is illustrated in the accompanying drawings.

Embodiments of the present disclosure are broadly directed to an adjustable saddle and method of use of the adjustable saddle. The adjustable saddle may introduce benefits beyond that of a standard saddle. Unlike a standard saddle, elements of the adjustable saddle are modular, which provides benefits in the ability to accommodate riders of differing needs, sizes, and the like. For example, the adjustable saddle may be adapted to accommodate riders with differing balance and/or postural requirements, as well as support riders in different riding positions. By way of another example, the adjustable saddle may be adjusted to accommodate riders of different sizes.

Another benefit of the adjustable saddle is that as the riders change and/or gain strength, supports on the adjustable saddle may be adjusted depending on what the rider may need or what muscles are being targeted. The saddle may be changed as the rider improves in strength, range of motion, and/or postural stability by adding or removing support. In addition, the rider may be placed in forward sitting, side sitting, backward sitting, and/or quadruped positions and supported in these positions by the adjustable saddle. Further, there may be a benefit of isolating particular muscle groups for further strengthening, lengthening, building stability, improving joint performance, enhancing joint alignment, and/or spinal integrity.

The adjustable saddle may benefit individuals with various diagnoses such as, but not limited to, cerebral palsy, hypotonia, and/or scoliosis. Broadly speaking, the adjustable saddle is intended for individuals who are unable to support themselves and control body movements on their own.

FIGS. 1A-6 generally depict an adjustable saddle 100, in accordance with one or more embodiments of the present disclosure.

Figure 1B:
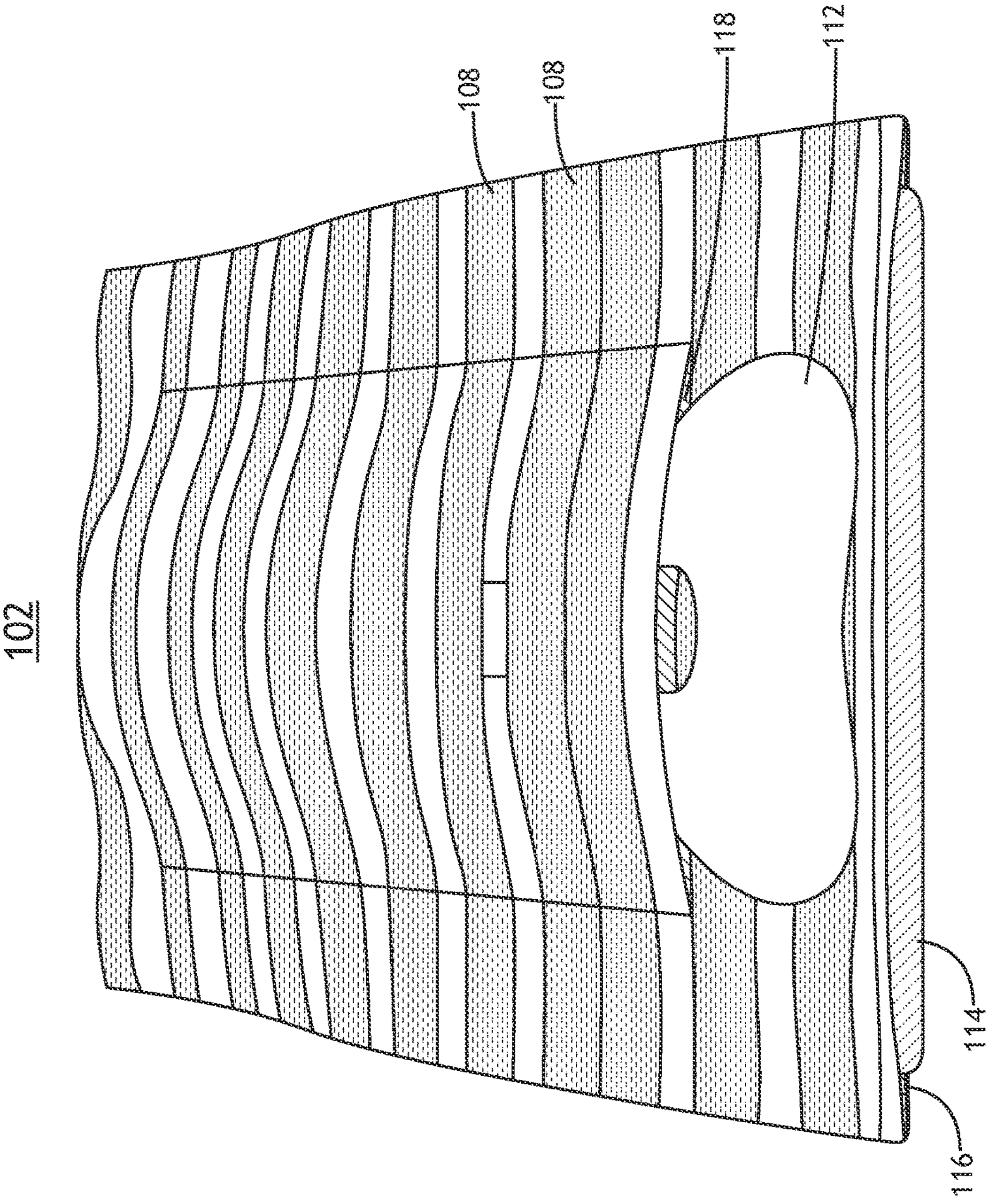
FIG. 1B is a top rear view of the adjustable saddle, in accordance with one or more embodiments of the present disclosure.

FIG. 1A is a perspective view of an adjustable saddle 100, in accordance with one or more embodiments of the present disclosure. FIG. 1B is a top rear view of the adjustable saddle 100, in accordance with one or more embodiments of the present disclosure.

In embodiments, the adjustable saddle 100 includes a saddle cover 102. For example, the saddle cover 102 may include at least a first side 104 and a second side 106. For instance, the first side 104 of the saddle cover 102 may form a bottom side of the saddle cover 102 and the second side 106 of the saddle cover 102 may form the top side of the saddle cover 102.

The saddle cover 102 may be made of any fabric suitable for use on a horse such as, but not limited to, fleece, leather, faux leather, canvas, or the like. Further, a first side 104 of the saddle cover 102 (e.g., the side of the saddle cover 102 that is in contact with the back of a horse) may be made from a different material than a second side 106 of the side of the saddle cover 102 (e.g., the side of the saddle cover 102 that the rider will sit on).

The saddle cover 102 may further include one or more fasteners 108. For example, the one or more fasteners 108 may be coupled to the second side 106 of the saddle cover 102. By way of another example, the one or more fasteners 108 may be coupled to the first side 104 of the saddle cover 102.

For example, the first side 104 of the saddle cover 102 may be made from a soft or smooth material. By way of another example, the second side 106 of the saddle cover 102 may include one or more fasteners 108 (e.g., the one or more fasteners 108 are disposed on the second side 106 of the saddle cover 102). The fasteners 108 may include, but are not limited to, hook and loop fasteners (e.g., strips of hook and loop fasteners or a second side 106 of the saddle cover 102 entirely made from hook and loop fasteners), snap fasteners, zipper fasteners, or the like.

The adjustable saddle 100 may further include one or more blocks 110. For example, the one or more of blocks 110 may be removably coupled to the saddle cover 102 of the adjustable saddle 100. For instance, the fasteners 108 may be used to removably couple the one or more blocks 110 to the saddle cover 102 (e.g., the blocks 110 may be modular with respect to the adjustable saddle 100). In this way, the fasteners 108 and the one or more blocks 110 may allow for modular use of the adjustable saddle 100 (e.g., the blocks 110 may be coupled to various locations on the adjustable saddle 100 in order to support riders with different needs). For instance, a rider may need more support around their legs, such that the one or more blocks 110 may be arranged to provide such support.

Figure 2:
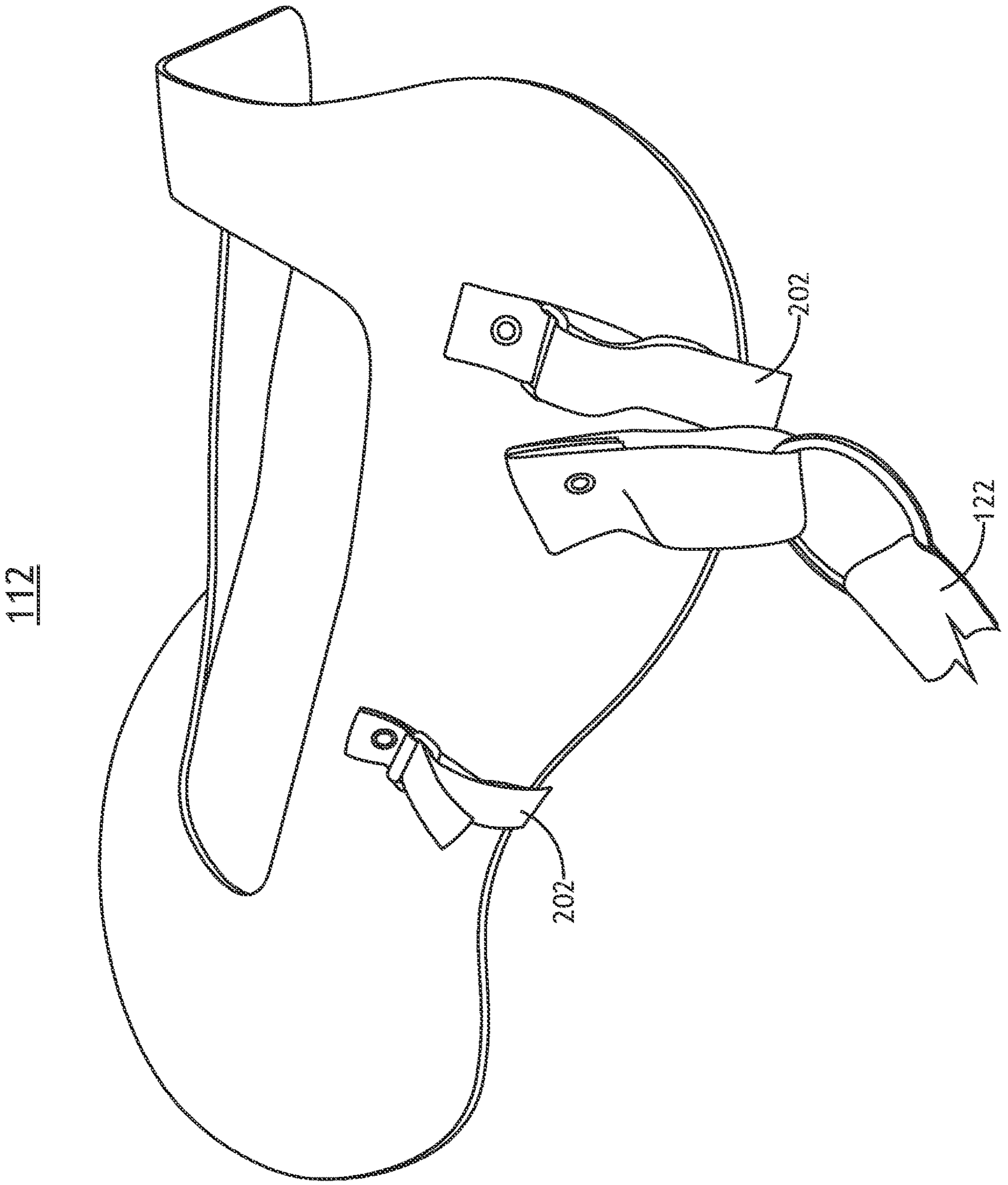
FIG. 2 is a side view of a saddle tree, in accordance with one or more embodiments of the present disclosure.

In embodiments, the adjustable saddle 100 includes a saddle tree 112. For example, the saddle tree 112 may be configured to form the shape of the adjustable saddle 100. For instance, as shown in FIG. 2, the saddle tree 112 may form the shape of the adjustable saddle 100 and/or give additional support to a rider.

In embodiments, the adjustable saddle 100 includes a saddle pad 114. For example, the saddle pad 114 may be configured to provide padding for the back of an animal when the adjustable saddle 100 is in use.

The saddle cover 102 may further include one or more pockets. For example, the saddle cover 102 may include at least a first pocket 116 and a second pocket 118. For instance, the first pocket 116 may include a bottom pocket and the second pocket 118 include a top pocket of the saddle cover 102. In this regard, the bottom pocket may be configured to hold the saddle pad 114 and the top pocket may be configured to hold the saddle tree 112.

It is noted that the first pocket 116 and the second pocket 118 need not be the same size. For example, the first pocket 116 may be approximately the same size as the saddle cover 102 as a whole, while the second pocket 118 may only be approximately as large as the area the rider will take up when riding the horse.

In embodiments, the one or more pockets of the saddle cover 102 include a single pocket. For example, the saddle tree 112 and the saddle pad 114 may be housed in the single pocket. By way of another example, the saddle tree 112 may be placed within the single pocket and the saddle pad 114 may be placed beneath the first side 104 of the saddle cover 102. By way of yet another example, both the saddle tree 112 and the saddle pad 114 may be placed below the first side 104 of the saddle cover 102.

In embodiments, the saddle cover 102 includes no pockets. In this way, both the saddle tree 112 and the saddle pad 114 may be placed below the first side 104 of the saddle cover 102.

The saddle pad 114 may be made of any material and/or be any thickness that cushions and/or protects the back of the horse when the adjustable saddle 100 is in use. For example, the saddle pad 114 may be made of cloth (e.g., a blanket, fleece, or the like), a cushion, foam (e.g., memory foam), or any combination thereof.

It is noted that the saddle tree 112 of the adjustable saddle 100 may be used independently from the saddle cover 102. For example, the saddle cover 102 may be used without the saddle tree 112, and vice versa. In embodiments, the saddle tree 112 is custom fit for each horse the adjustable saddle 100 will be used on. For example, the saddle tree 112 may be formed by generating a cast of the horse, where the cast is used to make the saddle tree 112. For instance, the saddle tree 112 made from a plastic (e.g., a thermoplastic, or the like), where the plastic saddle tree 112 is formed based on a cast of the horse. By way of another example, the saddle tree 112 may be moldable (e.g., not require a custom cast/injection mold), where the material is configured to mold to each horse. For instance, the saddle tree 112 may be formed of a moldable material such as, but not limited to, carbon fiber, or the like.

In embodiments, the saddle tree 112 is usable with the adjustable saddle 100 on a variety of different animals. For example, the saddle tree 112 may be made from a hard outer shell (e.g., thermoplastic or carbon fiber) with a material coupled to the underside of the hard outer shell that forms to the back of each horse (e.g., moldable foam, cloth, padding, soft rubber, or the like). Further, a saddle tree 112 that may be used on various animals may not include a soft underside to the hard outer shell, and instead rely on a thicker saddle pad 114.

Figure 4:
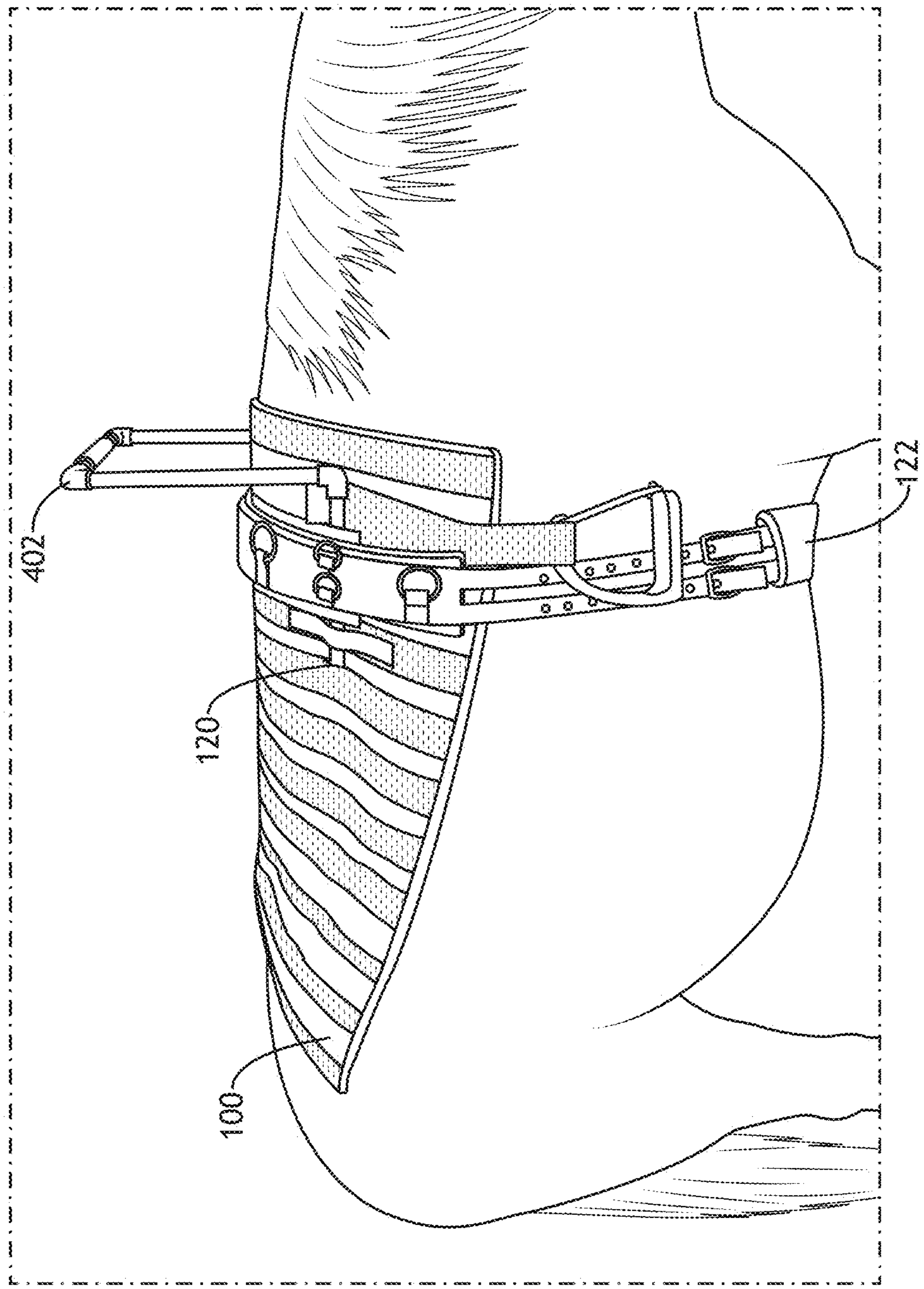
FIG. 4 is a side view of the adjustable saddle with a handle deployed on a horse, in accordance with one or more embodiments of the present disclosure.

The saddle tree 112 may further include one or more handle straps 202 configured to receive one or more portions of a handle (e.g., such as the handle 402 shown in FIG. 4).

Referring to FIG. 4, in embodiments, the adjustable saddle 100 includes a handle 402. For example, the handle 402 may be used to give additional support to a rider (e.g., arm support) that is difficult to achieve with the blocks 110 alone. In this way, the handle 402 may give the rider greater independence. Further, because of the weight bearing function of hands and shoulders, there may be an increase in postural control and shoulder stability.

It is noted that the handle 402 may be made from any material (e.g., plastic, a 3-dimensional (3D) printed material, conduit, metal, or the like). Further, it is noted that the handle 402 may be either static or adjustable. For example, the handle 402 may telescope to raise or lower the handle (e.g., to accommodate riders of various heights) (e.g., via telescoping, slotted holes on each side of the handle, or the like). The handle 402 may also widen or contract (e.g., to accommodate horses of various widths). The handle 402 may further be adjustable in length the position of the handle relative to the front or back of the horse (e.g., by sliding it in and out of the handle straps 202).

The handle 402 may also be attached to the saddle tree 112 with the handle straps 202 (as shown in FIG. 2). In this way, the handle 402 provides a sturdy support for a rider. For example, the handle 402 may be strapped to the saddle tree 112 with hook and loop straps, D-ring straps, or the like.

Figure 3:
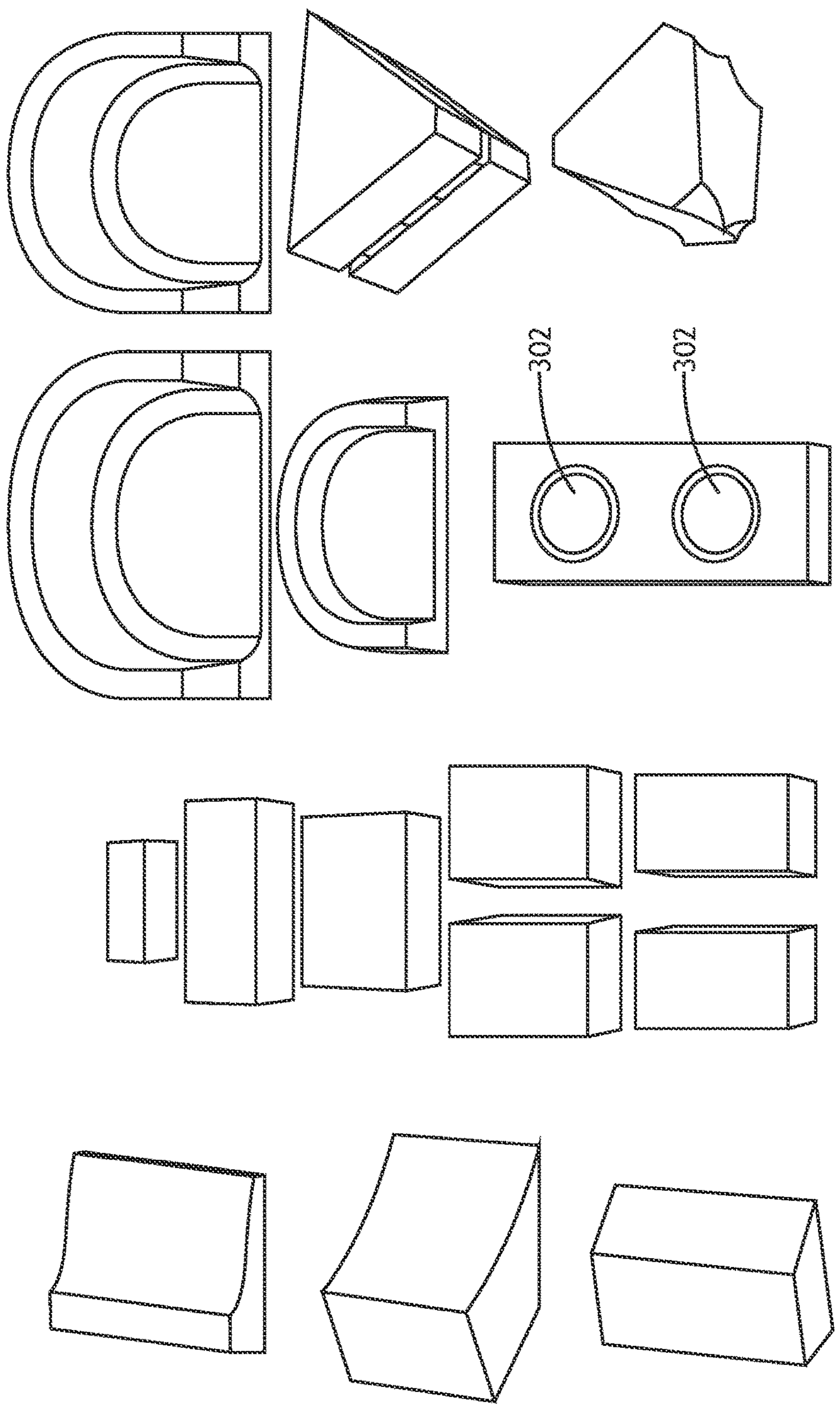
FIG. 3 is a top view of a plurality of blocks, in accordance with one or more embodiments of the present disclosure.

Referring to FIG. 3, which presents a nonlimiting assortment of blocks 110, in accordance with embodiments of the present disclosure. The blocks 110 may be of any shape or size. As shown in FIG. 3, the blocks 110 may be square (or rectangular), triangular, rounded, tapered at the edges, curved, parabolic, or the like. The blocks 110 may also be of sizes (e.g., length, width, and/or height) depending on where on the adjustable saddle 100 they will be placed (e.g., what part of the rider they will be supporting) and the size of the rider the blocks 110 will support. Further, each block 110 may be specially configured to support a different part of a rider (e.g., legs, pelvis, hips, back, or the like).

The blocks 110 may also be made from any suitable material (e.g., the blocks 110 may be made from foam, rubber, plastic, or the like). In this way, a set of blocks 110 may be customized for each rider. For example, the plurality of blocks 110 depicted in FIG. 3 may all be used in conjunction to support one particular rider on a horse, while another set of blocks 110 (not pictured) may be used to support a different rider on that same horse or a different animal. However, a set of blocks 110 used to support a particular rider need not be exclusive to that particular rider (e.g., some or all of the blocks 110 used to support a particular rider may be used to support a different rider). The set of blocks 110 a particular rider uses may also change over time. For example, as the rider grows, or more generally, the needs of that particular rider change, blocks 110 may be added, removed, altered, and/or replaced to accommodate the changing needs of that particular rider.

In embodiments, the plurality of blocks 110 includes one or more wedge blocks 110 (e.g., a triangular block 110). The one or more wedge blocks 110 may be placed between the legs of the rider (e.g., to help with tight adductor thigh muscles). Additionally, the one or more wedge blocks 110 may be used to support the trunk of the rider.

In embodiments, the plurality of blocks 110 includes one or more square blocks 110. When the rider is in the seated position, one or more square blocks 110 may be used to support the back of the rider. When the rider is in the quadruped position, the one or more square blocks 110 may be placed under the stomach of the rider to fully engage the stomach and/or lift the rider further off the adjustable saddle 100 and/or the saddle tree 112.

In embodiments, the plurality of blocks 110 includes one or more rectangular blocks 110. The one or more rectangular blocks 110 may be used to support and align different parts of the rider (e.g., the hips, pelvis, thighs, lower leg, and the like).

The preceding discussion of various shapes and sizes of blocks 110 should be interpreted as illustrative rather than limiting. It is contemplated that any size and/or shape of block 110 may serve any purpose when used with the adjustable saddle 100.

The adjustable saddle 100 may include one or more buttons 302. For example, a block 110 may include one or more buttons 302. In one instance, the one or more buttons 302 are coupled to a block 110, where the only purpose of coupling that block 110 to the adjustable saddle 100 is to hold the buttons 302. In another instance, the one or more buttons 302 are coupled to a block 110 that also supports a rider when the block 110 is coupled the adjustable saddle 100. It is contemplated that the range of motion of each rider, or other considerations and/or restrictions for each particular rider, may dictate the requirements of where to place the block 110 with the one or more buttons 302. It is noted that the one or more buttons 302 may be coupled to one or more blocks 110 (e.g., a block 110 may include one or more buttons 302) in any suitable manner (e.g., the buttons 302 are embedded in the block 110, the buttons 302 are glued to the block 110, the buttons 302 are fastened to the block 110 with hook and loop fasteners, or the like). In this way, the buttons 302 may be placed and adjusted on the adjustable saddle 100 with the same ease as the blocks 110 themselves.

By way of another example, the one or more buttons 302 may be configured to couple directly to the saddle cover 102 via one or more fasteners 108 on the saddle cover 102.

The one or more buttons 302 may be configured such that a rider presses a button 302 and the button 302 gives a command to the horse (e.g., pressing the button 302 causes an audible signal to be emitted). For example, a particular button 302 may correspond with a particular command for the horse and a rider pressing that particular button 302 will cause that command to be given to the horse. The one or more buttons 302 may correspond to either common riding commands (e.g., "walk on," "whoa," or the like) or may correspond to commands for a particular horse. In this regard, the one or more buttons 302 may give nonverbal riders, or riders with limited communication, the ability to effectively communicate with the horse.

Each block 110 may include a means to couple it to the saddle cover 102 (e.g., to the fasteners 108). For example, in the case where the blocks 110 are to be coupled to the saddle cover 102 with hook and loop fasteners, the blocks 110 may include the hook side of the fasteners and the saddle cover 102 may include the loop side of the fasteners, or vice versa. Further, in embodiments each block 110 is covered with a cloth or upholstery type material (e.g., a covering). In that case, the means for coupling the block 110 to the saddle cover 102 may be on the covering, instead of on the blocks 110 themselves.

The blocks 110 may also be stackable. For example, a first block 110 may be able to stack upon one or more additional blocks 110. This may be advantageous in instances where additional support is needed for different parts of the body (e.g., to support a rider's back).

Referring to FIG. 1A, in embodiments, the adjustable saddle 100 includes a cinch 122. The cinch 122 may secure the adjustable saddle 100 to the horse (e.g., as shown in FIGS. 4-5). The cinch 122 may be coupled to the saddle tree 112, either directly or via intermediary attachments (e.g., cinch strap and/or cinch ring). Additionally, the cinch 122 may either be permanently coupled or removably coupled to the saddle tree 112. Further, the cinch 122 may be coupled to the saddle tree 112 by any means known in the art. In embodiments (though not depicted here) more than one cinch 122 may be used to better secure the adjustable saddle 100 to the horse (e.g., a front cinch 122 and a back cinch 122).

In embodiments, the saddle cover 102 includes a plurality of openings 120. For example, elements of the adjustable saddle 100 that are coupled to components of the adjustable saddle 100 placed within the saddle cover 102 (e.g., the saddle tree 112) may be used outside of the saddle cover 102 (e.g., the openings 120 may permit access to one or more components within the saddle cover 102). For instance, the cinch 122 may be coupled to the saddle tree 112 inside of the saddle cover 102, but still be able to wrap around a horse and secure the adjustable saddle 100 to the horse. The saddle cover 102 may also have an opening 120 for a latigo (not pictured) and/or the handle 402.

Additionally, in order to accommodate the attachment of the handle 402 to the saddle tree 208 (e.g., via the handle straps 202 shown in FIG. 2), the saddle cover 102 may include one or more corresponding openings 120 for the handle 402.

In embodiments, the adjustable saddle 100 includes stirrups 124 (e.g., couped to the adjustable saddle 100 with stirrup straps). The stirrups 124 may either be coupled to the saddle cover 102 or to the saddle tree 112 (e.g., via one or more openings 122 in the saddle cover 102). The stirrups 124 may be coupled to the adjustable saddle 100 by any suitable means known in the art, including, but not limited to, hook and loop fasteners or strap and buckle fasteners. Further, the stirrups 124 may be adjustable in order to allow riders of different heights to utilize the stirrups 124 and the adjustable saddle 100. Any stirrup 124 may be used with the adjustable saddle (e.g., peacock stirrups 124 or Devonshire stirrups 124). For example, FIG. 1A shows peacock stirrups 124 coupled to the adjustable saddle 100.

Figure 5A:
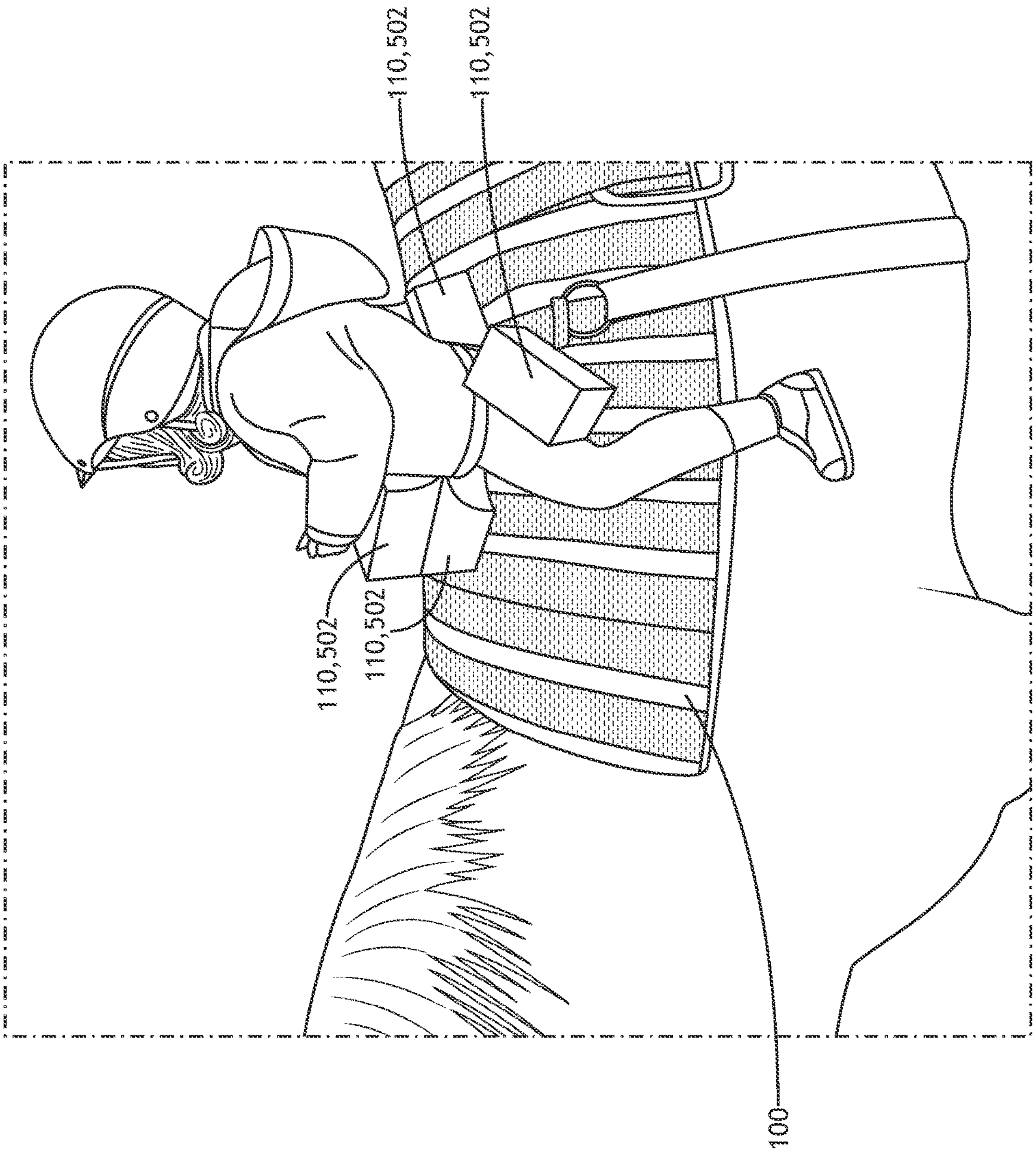
FIG. 5A is a side view of the adjustable saddle deployed on a horse with a plurality of blocks supporting a rider, in accordance with one or more embodiments of the present disclosure.

FIG. 4 is a side view of the adjustable saddle 100 deployed on a horse, in accordance with one or more embodiments of the present disclosure. FIG. 5A is a side view of the adjustable saddle 100 deployed on a horse with a plurality of blocks 110 supporting a rider, in accordance with one or more embodiments of the present disclosure.

In embodiments, the adjustable saddle 100 may first be placed on a horse. After the adjustable saddle 100 is placed on the horse, the rider may be positioned on the horse with the aid of blocks 110 to support the rider. As depicted in FIG. 5A, the blocks 110 may be positioned in any manner necessary to support the rider (e.g., positioned at the front of the rider, the back of the rider, and/or the legs of the rider). Additionally, FIG. 5A shows the blocks 110 are stacked at the front of the rider, where in this case, additional support is necessary.

Further, it may not matter whether the rider or the blocks 110 are placed on the adjustable saddle 100 first. For example, in certain circumstances, it may be advantageous to position the rider on the adjustable saddle 100, and then use the blocks 110 to adjust the posture of the rider and position the rider. By way of another example, there may be a known block configuration for a certain rider, in which case the blocks 110 may be placed on the adjustable saddle 100 before the rider is placed on the adjustable saddle 100.

However, the arrangement of blocks 110 depicted in FIG. 5A, and the ways in which the blocks 110 support the rider, is merely illustrative, as the adjustable saddle 100 allows for numerous different arrangements of blocks 110, which may provide support to a rider at any number of critical points, depending on the postural and balance needs to the particular rider.

The blocks 110 may be used to form a modular perimeter 502 around the rider. The modular perimeter 502 need not form a full perimeter around the rider. Instead, the modular perimeter 502 may form a fractured perimeter (e.g., a perimeter with gaps in it) around the rider. In this way, the modular perimeter 502 may provide support to the rider where needed, without unnecessarily restricting motion or mobility of the rider.

For example, each block 110 may form a module of the modular perimeter 502. Each module (e.g., block 110) of the modular perimeter 502 may then be moved or adjusted to create a modular perimeter 502 to accommodate the needs to each rider.

Figure 5B:
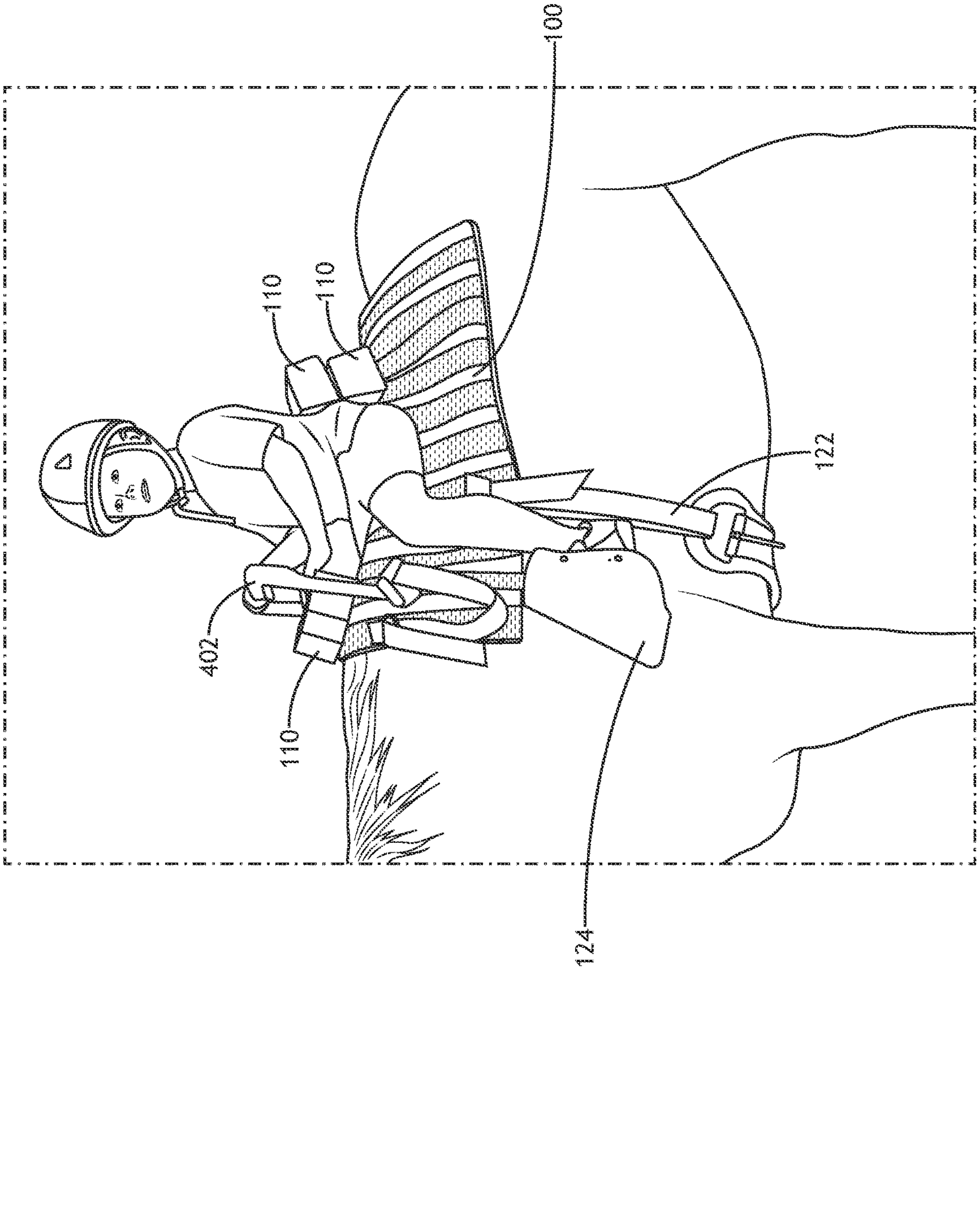
FIG. 5B is a side view of the adjustable saddle deployed on a horse with a plurality of blocks supporting a rider, in accordance with one or more embodiments of the present disclosure.

FIG. 5B is a side view of the adjustable saddle 100 deployed on a horse with a plurality of blocks 110 supporting a rider, in accordance with one or more embodiments of the present disclosure. In FIG. 5B, a rider is supported on the horse with the one or more blocks 110, as well as with the handle 402. Further, FIG. 5B depicts a rider using Devonshire stirrups 124 with the adjustable saddle 100.

Figure 5C:
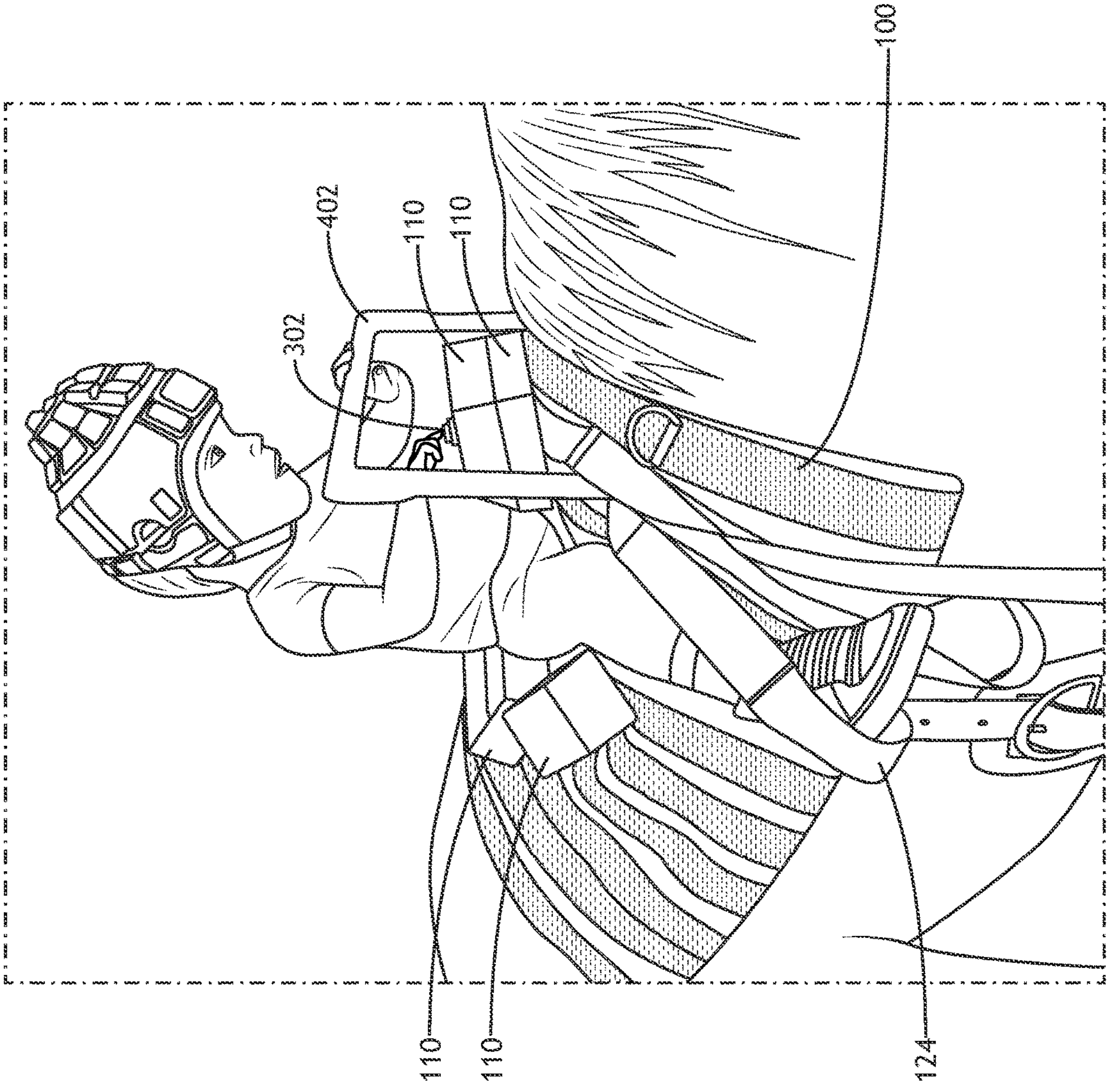
FIG. 5C is a perspective view of the adjustable saddle deployed on a horse with a plurality of blocks supporting a rider, in accordance with one or more embodiments of the present disclosure.

FIG. 5C is a perspective view of the adjustable saddle 100 deployed on a horse with a plurality of blocks 110 supporting a rider, in accordance with one or more embodiments of the present disclosure. FIG. 5C shows a rider supporting themselves with the handle 402 with one hand, while using their other hand to press a button 302 to give a command to the horse.

FIGS. 5A-5C further depict embodiments where the blocks 110 are upholstered.

Figure 6:
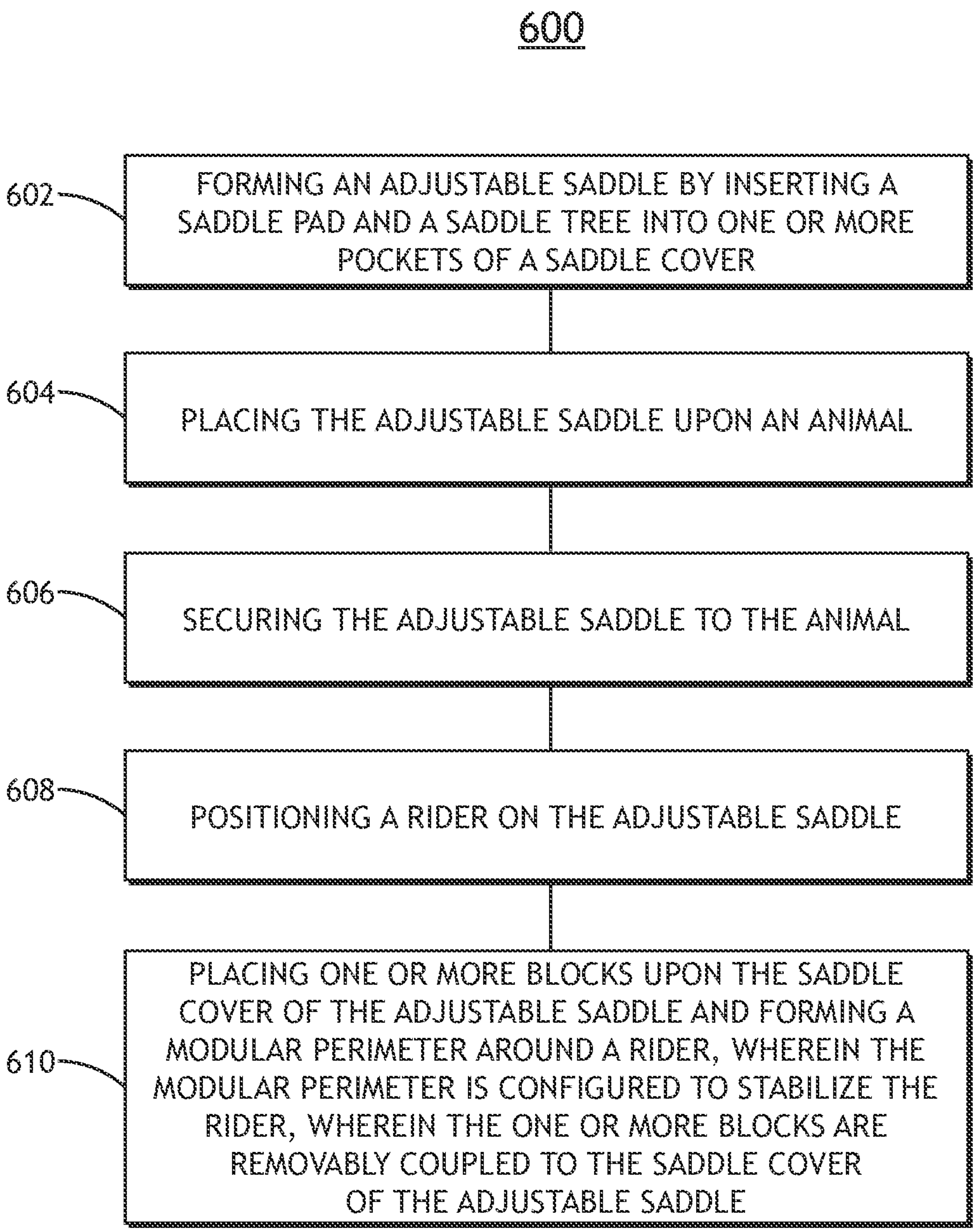
FIG. 6 is a flow diagram depicting a method or process for using the adjustable saddle to support a rider on a horse, in accordance with one or more embodiments of the present disclosure.

FIG. 6 is a flow diagram depicting a method 600 for using the adjustable saddle 100, in accordance with one or more embodiments of the present disclosure. Applicant notes that the embodiments and enabling technologies described previously herein in the context of the adjustable saddle 100 should be interpreted to extend to the method 600. It is further noted, however, that the method 600 is not limited to the architecture of the adjustable saddle 100.

In embodiments, the method 600 includes a step 602 of forming an adjustable saddle by inserting a saddle pad and a saddle tree into one or more pockets of a saddle cover. For example, the saddle cover may have a single pocket, wherein both the saddle pad and the saddle tree would be placed within the single pocket. By way of another example, the saddle cover may have pockets specifically configured for both the saddle pad (e.g., a first pocket) and the saddle tree (e.g., a second pocket) to be placed individually.

In embodiments, the method 600 includes a step 604 of placing the adjustable saddle upon the animal. For example, the adjustable saddle may be placed upon the back of the animal (e.g., a horse) and positioned so that a user may ride the animal while sitting on the adjustable saddle.

In embodiments, the method 600 includes a step 606 of securing the adjustable saddle to the animal. The adjustable saddle may be secured by wrapping a single cinch or multiple cinches (e.g., a front cinch and a back cinch) around the stomach and/or chest of the animal.

In embodiments, the method 600 includes a step 608 of positioning a rider on the adjustable saddle. In this step 608, the rider may be placed on the adjustable saddle. The posture of the rider may further by manipulated in order to obtain the optimal seating configuration based on the posture and balance of the rider.

In embodiments, the method 600 includes a step 610 of placing one or more blocks upon the saddle cover of the adjustable saddle, forming a modular perimeter around a rider, wherein the modular perimeter is configured to stabilize the rider wherein, the one or more blocks are removably coupled to the saddle cover of the adjustable saddle. For example, the one or more blocks may be arranged in a manner such that they support different parts of the rider (e.g., the legs, pelvis, hips, front, back, or the like). Additional blocks may be added or stacked upon each other in order to get the desired amount of support for the rider.

It is to be understood that embodiments of the methods disclosed herein may include one or more of the steps described herein. Further, such steps may be carried out in any desired order and two or more of the steps may be carried out simultaneously with one another. Two or more of the steps disclosed herein may be combined in a single step, and in some embodiments, one or more of the steps may be carried out as two or more sub-steps. Further, other steps or sub-steps may be carried in addition to, or as substitutes to one or more of the steps disclosed herein.

Although inventive concepts have been described with reference to the embodiments illustrated in the attached drawing figures, equivalents may be employed and substitutions made herein without departing from the scope of the claims. Components illustrated and described herein are merely examples of a system/device and components that may be used to implement embodiments of the inventive concepts and may be replaced with other devices and components without departing from the scope of the claims. Furthermore, any dimensions, degrees, and/or numerical ranges provided herein are to be understood as non-limiting examples unless otherwise specified in the claims.

What is claimed is:

1. An adjustable saddle, the adjustable saddle comprising:

a saddle tree configured to form a shape of the adjustable saddle, wherein the saddle tree is formed of a hard outer shell, wherein the saddle tree is shaped to conform to a back of an animal;

a saddle cover, the saddle cover including at least a first side and a second side, wherein the first side is configured to make contact with the back of the animal, wherein the second side is configured to make contact with a portion of a rider, wherein the second side includes a plurality of fasteners, wherein the plurality of fasteners are arranged as strips extending transversely across the second side of the saddle cover, the saddle cover further comprising:

a pocket configured to receive the saddle tree, wherein the pocket includes at least a first layer and a second layer at least partially formed by one or more surfaces of the saddle cover, wherein the pocket includes an opening to receive the saddle tree; and one or more blocks configured to be removably couplable to the second side of the saddle cover via the plurality of fasteners, wherein the one or more blocks are configured to form a modular perimeter around the rider, wherein the one or more blocks are stackable, wherein a first block is configured to stack upon one or more additional blocks, wherein the modular perimeter is configured to stabilize one or more body parts of the rider;

one or more adjustable stirrups coupled to one of the saddle cover or the saddle tree, wherein a length of the one or more adjustable stirrups is configured to be adjusted via an adjustment mechanism to accommodate riders of different heights, wherein the adjustment mechanism includes a strap and buckle fastener to adjust the length of the one or more adjustable stirrups; and an adjustable handle to provide arm support for the rider, wherein the adjustable handle is coupled to the saddle tree via one or more handle straps, wherein the one or more handle straps are directly coupled to the saddle tree, wherein the one or more handle straps are configured to slidably receive the adjustable handle, wherein the one or more handle straps include one or more D-ring straps, wherein one or more openings within the saddle cover are configured to permit access to the one or more handle straps, wherein a position of the adjustable handle is adjustable relative to a front of the animal, wherein a width of the adjustable handle is adjustable relative to a width of the animal to accommodate various animal widths.

2. The adjustable saddle of claim 1, wherein the one or more blocks are removably coupled to the plurality of fasteners via a plurality of hook and loop fasteners.

3. The adjustable saddle of claim 1, wherein the saddle tree further comprises:

one or more cinches coupled to one or more portions of the saddle tree, wherein one or more openings within the saddle cover are configured to permit access to the one or more cinches coupled to the saddle tree.

4. The adjustable saddle of claim 1, wherein the adjustable saddle further comprises:

one or more buttons, wherein each button of the one or more buttons is configured to generate an audible signal when pressed by the rider.

5. The adjustable saddle of claim 4, wherein the one or more buttons are removably coupled to the saddle cover of the adjustable saddle via the plurality of fasteners.

6. The adjustable saddle of claim 4, wherein the one or more buttons are coupled to at least one of the one or more blocks, wherein the at least one of the one or more blocks is removably coupled to the saddle cover of the adjustable saddle via the plurality of fasteners.

7. The adjustable saddle of claim 1, wherein the hard outer shell is formed of a thermoplastic material.

8. The adjustable saddle of claim 1, wherein the hard outer shell is formed of a carbon fiber material.

9. An adjustable saddle, the adjustable saddle comprising:

a removable saddle tree configured to form a shape of the adjustable saddle, wherein the removable saddle tree is formed of a hard outer shell, wherein the removable saddle tree is shaped to conform to a back of an animal;

a saddle pad;

a saddle cover, the saddle cover including a plurality of fasteners, a first side, and a second side;

one or more adjustable stirrups coupled to one of the saddle cover or the removable saddle tree, wherein a length of the one or more adjustable stirrups is configured to be adjusted via an adjustment mechanism to accommodate riders of different heights, wherein the adjustment mechanism includes a strap and buckle fastener to adjust the length of the one or more adjustable stirrups; and an adjustable handle to provide arm support for a rider, wherein the adjustable handle is coupled to the removable saddle tree via one or more handle straps, wherein the one or more handle straps are directly coupled to the saddle tree, wherein the one or more handle straps are configured to slidably receive the adjustable handle, wherein one or more openings within the saddle cover are configured to permit access to the one or more handle straps, wherein a position of the adjustable handle is adjustable relative to a front of the animal, wherein a width of the adjustable handle is adjustable relative to a width of the animal to accommodate various animal widths, the saddle cover further comprising:

a first pocket configured to receive the saddle pad wherein the first pocket includes a first opening to receive the saddle pad; and a second pocket superior to the first pocket and configured to receive the removable saddle tree, wherein the second pocket includes an additional opening to receive the removable saddle tree, wherein the first pocket completely overlaps the second pocket; and one or more blocks configured to be removably couplable to the saddle cover via the plurality of fasteners, wherein the one or more blocks are configured to form a modular perimeter around a rider, wherein the one or more blocks are stackable, wherein a first block is configured to stack upon one or more additional blocks, wherein the modular perimeter is configured to stabilize the rider;

wherein the removable saddle tree is contained within the second pocket, and wherein the saddle pad is contained within the first pocket, wherein the saddle pad is configured to pad the back of the animal when the adjustable saddle is on the back of the animal, wherein the saddle pad is configured to pad an entire saddle tree area.

10. The adjustable saddle of claim 9, wherein the adjustable saddle further comprises:

one or more buttons, wherein each button of the one or more buttons is configured to generate an audible signal when pressed by the rider.

11. The adjustable saddle of claim 10, wherein the one or more buttons are removably coupled to the saddle cover of the adjustable saddle via the plurality of fasteners.

12. The adjustable saddle of claim 9, wherein the hard outer shell is formed of a thermoplastic material.

13. The adjustable saddle of claim 9, wherein the hard outer shell is formed of a carbon fiber material.

* * * * *